(12) United States Patent
Li et al.

(10) Patent No.: US 11,615,291 B1
(45) Date of Patent: Mar. 28, 2023

(54) NEURAL NETWORK MODULES

(71) Applicant: X Development LLC, Mountain View, CA (US)

(72) Inventors: Adrian Li, San Francisco, CA (US); Mrinal Kalakrishnan, Palo Alto, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 351 days.

(21) Appl. No.: 16/918,181

(22) Filed: Jul. 1, 2020

Related U.S. Application Data

(63) Continuation of application No. 15/272,112, filed on Sep. 21, 2016.

(51) Int. Cl.
  *G06N 3/04* (2006.01)
  *G06N 3/08* (2023.01)

(52) U.S. Cl.
  CPC ............ *G06N 3/0454* (2013.01); *G06N 3/08* (2013.01)

(58) Field of Classification Search
  CPC ........... G06N 3/0454; G06N 3/08; G06N 3/04
  See application file for complete search history.

(56) References Cited

U.S. PATENT DOCUMENTS

| | | | |
|---|---|---|---|
| 5,283,855 A | 2/1994 | Motomura et al. | |
| 9,015,093 B1 | 4/2015 | Commons | |
| 9,177,246 B2 | 11/2015 | Buibas et al. | |
| 10,733,532 B2 * | 8/2020 | Hammond | H04L 67/01 |
| 10,748,057 B1 | 8/2020 | Li et al. | |
| 2004/0243358 A1 | 12/2004 | Schliep et al. | |
| 2005/0147292 A1 | 7/2005 | Huang et al. | |
| 2006/0004683 A1 | 1/2006 | Talbot et al. | |
| 2013/0254138 A1 | 9/2013 | Kudritskiy | |
| 2014/0132786 A1 | 5/2014 | Saitwal et al. | |
| 2015/0106306 A1 | 4/2015 | Birdwell et al. | |
| 2016/0155048 A1 | 6/2016 | McCormick et al. | |
| 2016/0217369 A1 | 7/2016 | Annapureddy et al. | |
| 2016/0299685 A1 | 10/2016 | Zhai et al. | |
| 2017/0011738 A1 | 1/2017 | Senior et al. | |
| 2017/0024644 A1 | 1/2017 | Van Der Made et al. | |
| 2017/0220929 A1 | 8/2017 | Rozen et al. | |

(Continued)

OTHER PUBLICATIONS

Happel, Bart LM, and Jacob MJ Murre. "Design and Evolution of Modular Neural Network Architectures." Neural Networks 7.6 (1994): 985-1004.

(Continued)

*Primary Examiner* — Li Wu Chang
(74) *Attorney, Agent, or Firm* — Gray Ice Higdon

(57) ABSTRACT

Methods, apparatus, and computer readable media related to combining and/or training one or more neural network modules based on version identifier(s) assigned to the neural network module(s). Some implementations are directed to using version identifiers of neural network modules in determining whether and/or how to combine multiple neural network modules to generate a combined neural network model for use by a robot and/or other apparatus. Some implementations are additionally or alternatively directed to assigning a version identifier to an endpoint of a neural network module based on one or more other neural network modules to which the neural network module is joined during training of the neural network module.

20 Claims, 12 Drawing Sheets

(56) References Cited

U.S. PATENT DOCUMENTS

2017/0300813 A1   10/2017  Lee et al.
2017/0351905 A1   12/2017  Wang et al.
2018/0005134 A1    1/2018  Kish et al.
2018/0053085 A1    2/2018  Matsumoto et al.

OTHER PUBLICATIONS

Kussul, M., et al. "A Visual Solution to Modular Neural Network System Development." System 5 (2002): 6. 7 pages.

* cited by examiner

NEURAL NETWORK MODULES

BACKGROUND

Neural network models can be utilized for various purposes, such as providing output that is utilized to control (directly or indirectly) one or more operations of a robot. As one example, a neural network model may be utilized to determine a classification of an object in a raw image. For instance, the raw image may be applied as input to the neural network model and one or more value(s) may be generated over the model based on the applied input. Those values may indicate the object class(es) to which the object belongs and one or more operations of a robot may be controlled based on the indicated object class(es). For example, if the object is of a set of one or more first classes, the robot may attempt to grasp the object. As another example, if the object is of a set of one or more second classes, the robot may adjust its trajectory to avoid the object.

SUMMARY

This specification is directed generally to combining and/or training one or more neural network modules based on version identifier(s) assigned to the neural network module(s). Some implementations are directed to using version identifiers of neural network modules in determining whether and/or how to combine multiple neural network modules to generate a combined neural network model for use by a robot and/or other apparatus. Some implementations are additionally or alternatively directed to assigning a version identifier to an endpoint of a neural network module based on one or more other neural network modules to which the neural network module is joined during training of the neural network module.

A combined neural network model (also referred to herein as a "combined model") joins a plurality of individual neural network modules (also referred to herein as "modules") to perform a particular task. Generally, each of the neural network modules is utilized in performing a "subtask" in performing the overall task of the combined neural network model. For example, a combined model may be utilized to perform the overall task of determining a classification of an object in a raw image by utilizing: a first module that can be utilized to perform a first subtask of extracting image features from the raw image; and a second module that can be utilized to perform a second subtask of determining an object class based on the image features extracted from the raw image by the first neural network module.

Each neural network module includes defined endpoints. Each of the endpoints includes one or more input(s) and/or output(s) and has a shape and a datatype. For example, a neural network module that is utilized to extract image features from a raw image may have a first endpoint that: includes inputs, has a data type that indicates "pixels", and has a shape that indicates the shape of the inputs (e.g., "256×256×3" for inputs configured to receive a three channel 256 by 256 pixel raw image). That neural network module may have a second endpoint that: includes outputs, has a data type that indicates "image features", and has a shape that indicates the shape of the outputs (e.g., 64×1 for outputs of 64 separate image features).

Two neural network modules may be joined in a combined neural network model if they have compatible endpoints. Two compatible endpoints have the same data type, the same shape, and one includes output(s) while the other includes input(s). For example, an outputs endpoint of a first neural network module may be joined to an inputs endpoint of a second neural network module if both of those endpoints are of the same data type and of the same shape. However, two neural network modules that are joined by compatible endpoints may not behave meaningfully with each other unless the joined endpoints are fully compatible. A given joinder of endpoints of two neural network modules is fully compatible if one or both of the modules has been trained by applying training examples to a combined model that includes the two modules with the given joinder. The training could involve backpropagation of error that is based on output of the model and the training examples, while training (e.g., updating values based on the backpropagation) only one of the two modules while keeping the other module fixed, and/or while training both of the modules.

In various implementations, a version identifier is assigned to an endpoint of a version of a neural network module to reflect that the version of the module has been trained when the endpoint was joined to an additional endpoint of an additional neural network module. The version identifier assigned to the endpoint may match (e.g., is the same as or otherwise identifies) a version identifier assigned to the additional module, such as a version identifier assigned to the additional endpoint to which the endpoint was joined during training of the module. The version identifier can be used to "tie" the version of the module to the additional module. For example, the version identifier can be used to restrict the version of the module to use in combined models that join the endpoint of the version of the module to the additional endpoint of the additional module.

Various implementations described herein may achieve various technical advantages. For example, some implementations may ensure that joined modules are used only when fully compatible. In some versions of those implementations, this may prevent joined non-fully compatible modules from being used without further training, which may prevent computationally wasteful output from being generated based on the non-fully compatible modules and/or potentially dangerous output from being generated based on the non-fully compatible modules. Some implementations may additionally or alternatively enable fully compatible modules to be reused in various combined models without further training and/or without the same extent of training as would have been required if the modules were non-fully compatible. Accordingly, less computational resources may be utilized since at least some training may be obviated and/or the extent of at least some training lessened. Some implementations may additionally or alternatively enable alternative modules to replace corresponding existing modules in a combined model, without necessitating that the entirety of the combined model be replaced and/or trained (or trained to the same extent). This may also save computational resources and/or reduce network traffic that may otherwise be required to train and/or transmit the entirety of an updated combined model. Additional or alternative technical advantages may be achieved, such as one or more described elsewhere in this specification.

In some implementations, a method is provided that includes identifying, from one or more computer readable media, a first neural network module and a second neural network module. The first neural network module and the second neural network module each have a plurality of endpoints. Each of the endpoints include one or more inputs or one or more outputs and a shape and datatype of a first endpoint of the endpoints of the first neural network module match those of a second endpoint of the endpoints of the second neural network module. The method further includes generating a combined neural network model that combines at least the first neural network module and the second neural network module. Generating the combined neural network model includes joining the first endpoint of the first neural network module and the second endpoint of the second neural network module. The method further includes determining whether a first version identifier assigned to the first endpoint of the first neural network module matches a second version identifier assigned to the second endpoint of the second neural network module. The method further includes, in response to determining that the first version identifier does match the second version identifier, using the combined neural network model. The method further includes, in response to determining that the first version identifier does not match the second version identifier: training at least the first neural network module to generate a refined version of the combined neural network model; and using the refined version of the combined neural network model. Training the first neural network module includes applying training examples to the combined neural network model.

This method and other implementations of technology disclosed herein may each optionally include one or more of the following features.

In some implementations, using the combined neural network model includes: obtaining input data that is based on one or more sensors of a robot; applying the input data as input to the combined neural network model; generating, over the combined neural network model, output that is based on applying the input to the combined neural network model; and using the output to control one or more actuators of the robot.

In some implementations, the method further includes: in response to training at least the first neural network module to generate the refined version: replacing the first version identifier with a new version identifier. In some versions of those implementations, the new version identifier matches the second version identifier when training at least the first neural network module to generate the refined version occurs without any training of the second neural network module. In some other versions of those implementations, training at least the first neural network module to generate the refined version further includes training the second neural network module, and the method further includes: replacing the second version identifier with an additional version identifier. Replacing the first version identifier with the new version identifier may include using the additional version identifier as the new version identifier.

In some implementations, using the combined neural network model in response to determining that the first version identifier does match the second version identifier includes using the combined neural network model without further training of the first neural network module or the second neural network module.

In some implementations, a method is provided that includes identifying a combined neural network model that combines at least a first neural network module and a second neural network module. The first neural network module and the second neural network module each have a plurality of endpoints. Each of the endpoints include one or more inputs or one or more outputs and a shape and datatype of a first endpoint of the endpoints of the first neural network module match those of a second endpoint of the endpoints of the second neural network module. The combined neural network model joins the first endpoint of the first neural network module and the second endpoint of the second neural network module. The method further includes training at least the first neural network module to generate a refined version of the first neural network module. Training the first neural network module includes applying training examples to the combined neural network model. The method further includes, in response to the training, assigning a version identifier to the refined version of the first neural network module. The version identifier identifies the second neural network module or a refined version of the second neural network module. The method further includes using the version identifier to restrict the refined version of the first neural network module to use in one or more neural network models that join the first endpoint of the refined version of the first neural network module and the second endpoint of the second neural network module or the refined version of the second neural network module.

This method and other implementations of technology disclosed herein may each optionally include one or more of the following features.

In some implementations, training at least the first neural network module further includes training the second neural network module to create the refined version of the second neural network module. In some of those implementations, the version identifier identifies the refined version of the second neural network module and the method optionally further includes, in response to the training, also assigning the version identifier to the refined version of the second neural network module.

In some implementations, the second neural network module is pre-trained and training at least the first neural network module includes training the first neural network module without any further training of the second neural network module. In some of those implementations, the version identifier is also assigned to the second neural network module and is assigned to the second neural network module prior to training at least the first neural network module.

In some implementations, the version identifier is assigned to the first endpoint of the first neural network module and an additional version identifier is assigned to another one of the endpoints of the first neural network module.

In some implementations, the method further includes: receiving, via one or more network interfaces, a request to combine the first neural network module and the second neural network module; and in response to the request, identifying the refined version of the first neural network module based on the version identifier of the first neural network module identifying the second neural network module or the refined version of the second neural network module.

In some implementations, the method further includes: receiving, via one or more network interfaces, a request to combine the first neural network module and the second neural network module; and the training is in response to the request.

In some implementations, the method further includes: identifying an additional combined neural network model that combines at least the first neural network module and a third neural network module. The additional combined neural network model joins the first endpoint of the first neural network module and a third endpoint of the third neural network module. In those implementations, the method further includes: training at least the first neural network module to generate an additional refined version of the first neural network module. Training the first neural network module to generate the additional refined version includes applying additional training examples to the additional combined neural network model. In those implementations, the method further includes: in response to the training to generate the additional refined version, assigning an additional version identifier to the additional refined version of the first neural network module; and using the additional version identifier to restrict the additional refined version of the first neural network module to use in one or more neural network models that join the first endpoint of the first neural network module and the third endpoint of the third neural network module or a refined version of the third neural network module. The additional version identifier identifies the third neural network module or a refined version of the third neural network module.

In some implementations, the combined neural network model further combines a third neural network module with the first neural network module and the second neural network module.

In some implementations, the method further includes generating the combined neural network model. In some of those implementations, the first neural network module and the second neural network module are each pre-trained prior to generating the combined neural network model.

In some implementations, a method is provided that includes identifying a neural network model stored in one or more computer readable media of a robot and in use by the robot. The neural network model includes a first neural network module and a second neural network module, the first neural network module and the second neural network module each have a plurality of endpoints, and in the neural network model a first endpoint of the endpoints of the first neural network module is joined to a second endpoint of the endpoints of the second neural network module. The method further include: identifying a version identifier assigned to the second endpoint of the second neural network module; and modifying the neural network model by replacing the first neural network module with an alternative module. Replacing the first neural network module with the alternative module is based on the version identifier assigned to the second endpoint of the second neural network module.

This method and other implementations of technology disclosed herein may each optionally include one or more of the following features.

In some implementations, replacing the first neural network module based on the version identifier includes selecting a version of the alternative module for replacing the first neural network module. Selecting of the version of the alternative module is from a plurality of candidate different versions of the alternative module and is based on the version identifier matching the version.

In some implementations, replacing the first neural network module based on the version identifier includes: determining that the version identifier does not match any version of the alternative module; and in response to determining that the version identifier does not match, training at least the second neural network module. Training the second neural network module includes applying training examples to the modified neural network model that replaces the first neural network module with a version of the alternative module.

In some implementations, a method is provided that includes identifying a first neural network module and a second neural network module. The first neural network module and the second neural network module each have a plurality of endpoints, each of the endpoints include one or more inputs or one or more outputs, and a shape and datatype of a first endpoint of the endpoints of the first neural network module match those of a second endpoint of the endpoints of the second neural network module. The method further includes, in response to a request to generate a combined neural network model that joins the first endpoint of the first neural network module and the second endpoint of the second neural network module: determining whether a first version identifier assigned to the first endpoint of the first neural network module matches a second version identifier assigned to the second endpoint of the second neural network module; and generating the combined neural network model in a manner that is dependent on whether the first version identifier matches the second version identifier.

Other implementations may include a non-transitory computer readable storage medium storing instructions executable by at least one processor (e.g., a central processing unit (CPU) and/or graphics processing unit (GPU)) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Some implementations of the technology described herein are directed to combining and/or training one or more neural network modules based on version identifiers of the neural network modules. Some implementations are directed to using version identifiers of neural network modules in determining whether and/or how to combine multiple neural network modules to generate a combined neural network model for use by a robot and/or other apparatus. Some implementations are additionally or alternatively directed to assigning a version identifier to an endpoint of a neural network module based on one or more other neural network modules to which the neural network module is joined during training of the neural network module. Additional description of these and other implementations of the technology is provided below.

Figure 1:
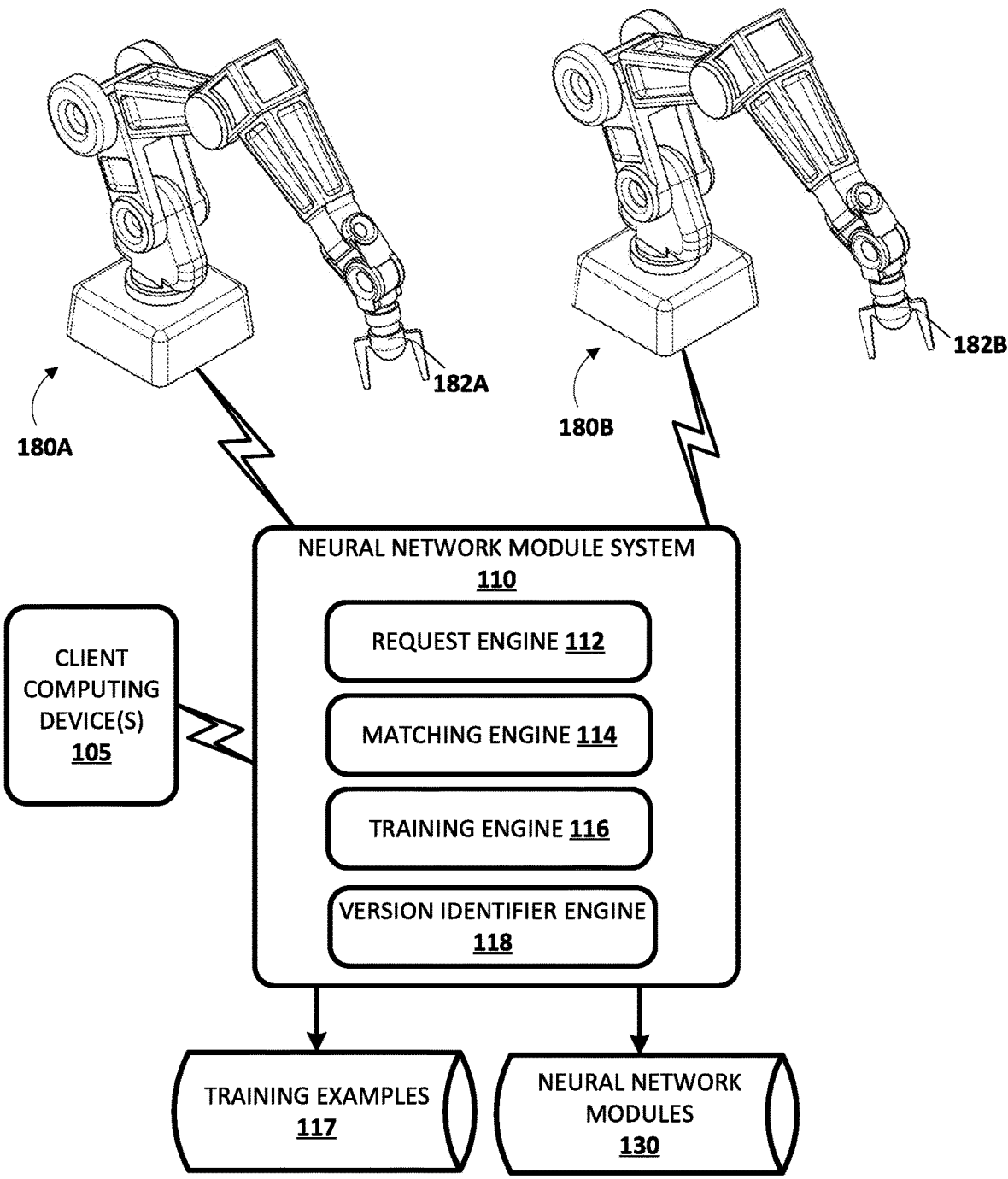
FIG. 1 illustrates an example environment in which implementations disclosed herein may be implemented.

FIG. 1 illustrates an example environment that includes robots 180A and 180B, client computing device(s) 105, neural network module system 110, training examples database 117, and neural network modules database 130. Robots 180A and 180B are "robot arms" having multiple degrees of freedom to enable traversal of grasping end effectors 182A and 182B along any of a plurality of potential paths to position the grasping end effectors 182A and 182B in desired locations. Robots 180A and 180B each further controls the two opposed "claws" of their corresponding grasping end effector 182A, 182B to actuate the claws between at least an open position and a closed position (and/or optionally a plurality of "partially closed" positions).

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors.

In various implementations, combined neural network models generated according to implementations described herein may be used by robots 180A, 180B, and/or other robots in performing various robotic functions. As one example, sensor data generated by one or more sensors associated with robot 180A may be applied as input to a combined model and output, generated over the combined model based on the input, may be utilized to determine a trajectory of grasping end effector 182A and/or when a grasp is attempted by grasping end effector 182A. Some non-limiting examples of sensors associated with the robot 180A that may be used as input to a combined model (and/or on which input may be based) include one or more vision sensors (e.g., a stereographic camera, a monographic camera, a three-dimensional laser scanner), positional and/or other sensors associated with actuators of the robot 180A, and/or a force torque sensor.

In various implementations, all or aspects of neural network module system 110 may be implemented on robot 180A, robot 180B (e.g., via one or more processors of robots 180A and 180B), and/or other robots. For example, robots 180A and 180B may each include an instance of one or more aspects of the neural network module system 110. In some implementations, all or aspects of neural network module system 110 may be implemented on one or more computer systems that are separate from, but in network communication with, robots 180A and 180B. In some of those implementations, those aspects of neural network module system 110 may communicate with the robots 180A and 180B via one or more networks such as a local area network (LAN) and/or wide area network (WAN) (e.g., the Internet).

Although robots 180A and 180B are illustrated in FIG. 1, and robots are described in some examples herein, it is noted that some implementations may be implemented in non-robotics applications. For example, combined neural network models generated according to implementations described herein may be used by non-robotics computing devices, such as client computing device(s) 105. Client computing device(s) 105 may include, for example, a desktop computing device, a laptop computing device, a stand-alone hardware device at least in part dedicated to automated assistance, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Each of the client computing device(s) 105 may share one or more aspects in common with example computing device 1110 of FIG. 11.

The neural network module system 110 may include one or more memories for storage of data and software applications, one or more processors for accessing data and executing applications, and other components that facilitate communication over a network. The operations performed by neural network module system 110 may be distributed across multiple computing devices. Neural network module system 110 may be implemented as, for example, computer programs running on one or more computers in one or more locations that are coupled to each other through a network.

In various implementations, the neural network module system 110 may include a request engine 112, a matching engine 114, a training engine 116, and a version identifier engine 118. In some implementations, one or more of engines 112, 114, 116, and/or 118 may be omitted, combined, and/or implemented in a component that is separate from neural network module system 110. For example, one or more of engines 112, 114, 116, and/or 118, or any operative portion thereof, may be implemented in a component that is executed by one or more of client computing device(s) 105 and/or the robots 180A and/or 180B.

The request engine 112 generates and/or receives various requests related to combining multiple neural network modules in a combined neural network model. The request engine 112 provides those requests to matching engine 114 to enable matching engine 114 to identify module(s) that conform to the requests. As one example, a user may utilize a graphical user interface of one of the client computing device(s) 105 to select a module of neural network modules database 130. In response, the request engine 112 may receive or generate a request to locate other module(s) of neural network modules database 130 that have an endpoint that is compatible and/or fully compatible with any of the endpoints of the selected module. For instance, a user may select a module that has an outputs endpoint with a data type of "image features" and a shape of 64×1. The request engine 112 may generate a request to locate other modules that have inputs endpoints with a data type of "image features" and a shape of 64×1. In some of those instances, the request engine 112 may optionally generate the request to locate only other modules that have inputs endpoints with a version identifier that matches that of the outputs endpoint of the selected module (e.g., if user interface input is provided that indicates a desire for only modules fully compatible with the outputs endpoint of the selected module).

As another example, the request engine 112 may generate a request to replace a given module of an existing combined model of robot 180A with an alternative module (e.g., a more up to date version of the given module and/or an alternative module with different functionality) of that module. In some implementations, the request engine 112 may generate the request based on a received update inquiry or other data generated by the robot 180A. For example, the robot 180A may periodically send an update inquiry to neural network module system 110 to check for updated versions of the given module. Also, for example, the robot 180A may request an alternative module that has different functionality than the given module, and may request the alternative module based on a task to be performed by the robot 180A (e.g., seeking an alternative module that is more suited for the task than is the given module). In some implementations, the request engine 112 may generate the request based on previously received data that indicates the given module exists on the robot 180A, and identifying that an alternative module of the given module is available (e.g., a "push" update). In some implementations, the request engine 112 may optionally generate the request to include version identifier(s) of endpoints of other module(s) that are joined to the given module in the existing combined model of robot 180A. In some versions of those implementations, the version identifier(s) may be utilized by the matching engine 114 to locate only version(s) of the alternative module that have one or more endpoints with version identifier(s) that match the version identifier(s) of the request. In some other versions of those implementations, the version identifier(s) may be utilized to determine further training by the training engine 116 is required prior to use of a modified version of the combined model of robot 180A that replaces the given module with the alternative module. Additional description of these and other aspects of the request engine 112 are provided below.

As mentioned above, the matching engine 114 identifies, from neural network modules database 130, module(s) that match requests of the request engine 112. The matching engine 114 provides an indication of the matching module(s), and optionally the matching module(s) themselves, to one or more other components. For example, when a request is based on user interface input from one of the client computing device(s) 105, the matching engine 114 may provide, to that client computing device, an indication of the module(s) that match the request. The matching module(s) may be provided for presentation on one or more user interface output devices of that client computing device (e.g., as graphical elements that describe the matching module(s)). In some of those implementations, in response to further user interface input from the client computing device that selects one of the indications of the matching modules, the matching engine 114 may generate a combined model that includes the selected module and/or may cause training engine 116 to perform training of one or more modules of the combined model. As another example, when a request is for replacement of a given module of a combined model of a robot, the matching engine 114 may cause the replacement module to replace the given module in the combined model and/or cause training engine 116 to perform training of one or more modules of the combined model that includes the replacement module.

The training engine 116 trains one or more modules of a combined model in various situations. In some implementations, the training performed by the training engine 116 includes applying training examples, from training examples database 117, to the combined model and training one or more of the modules based on application of the training examples. In some of those implementations, the training is based on backpropagation of error that is based on the training examples and output of the combined model, while training (e.g., updating values based on the backpropagation) one or more of the modules of the combined model.

The version identifier engine 118 assigns version identifiers to endpoints of versions of neural network modules in response to training performed by training engine 116. For example, the version identifier engine 118 assigns a version identifier to an endpoint of a version of a module to reflect that the version of the module has been trained when the endpoint was joined to an additional endpoint of an additional neural network module. The version identifier assigned to the endpoint may match (e.g., is the same as or otherwise identifies) a version identifier assigned to the additional module, such as a version identifier assigned to the additional endpoint to which the endpoint was joined during training of the module. The version identifier can be used to "tie" the version of the module to the additional module. For example, the version identifier can be used to restrict the version of the module to use in combined models that join the endpoint of the version of the module to the additional endpoint of the additional module. For instance, the neural network module system 110 and/or the robots 180A and 180B may prevent joined modules from being used if the endpoints that join the modules do not have matching version identifiers. In some implementations, assigning a version identifier to an endpoint of a version of a neural network module includes storing, in one or more computer readable media (e.g., database 130), the version identifier and a mapping (e.g., data defining an association) of the version identifier to the endpoint.

Figure 2A:
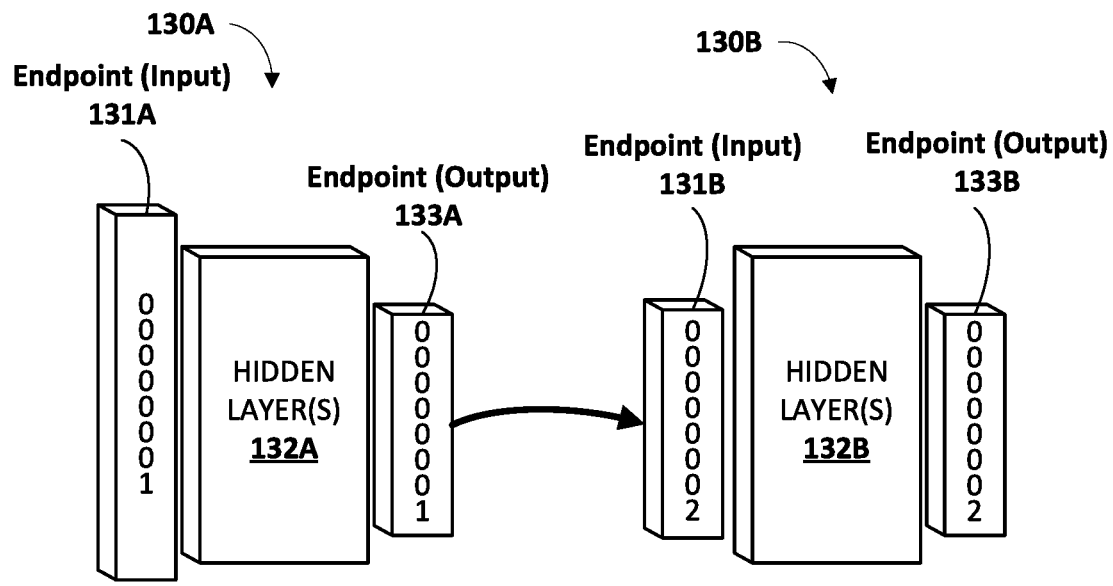
FIG. 2A illustrates two neural network modules, version identifiers assigned to endpoints of the modules, and how compatible endpoints of the modules may be joined.

Referring now to FIGS. 2A-5, additional description is provided of various components of FIG. 1. FIG. 2A illustrates module 130A and module 130B of neural network modules database 130. The module 130A includes an input endpoint 131A, an output endpoint 133A, and one or more hidden layers 132A interposed between the endpoints 131A and 133A. The endpoints 131A and 133A are both illustrated with the same version identifier, "00000001". The module 130B includes input endpoint 131A, an output endpoint 133B, and one or more hidden layers 132B interposed between the endpoints 131A and 133B. The endpoints 131B and 133B are both illustrated with the same version identifier, "00000002".

The arrow between output endpoint 133A and input endpoint 131B indicates that those endpoints have been joined (e.g., spliced). In FIG. 2A, the endpoints 133A and 131B are compatible (i.e., have the same shape and datatype). However, the endpoints 133A and 131B are not fully compatible as their version identifiers do not match, indicating that neither of the modules 130A and 130B have been trained by applying training examples to a combined model that includes a joinder of the endpoints 133A and 131B.

In some implementations, matching engine 114 may identify the modules 130A and 130B in response to a request generated by the request engine 112. For example, in response to user interface input via client computing device 105, request engine 112 may generate and/or submit a request to matching engine 114 that indicates a desire to generate a combined model that joins modules 130A and 130B. Matching engine 114 may identify modules 130A and 130B based on the request. As another example, module 130B may be identified based on it being a replacement for a given module of an existing combined model of robot 180A, where the existing combined model already includes module 130A with the output endpoint 133A joined to an input endpoint of the given module to be replaced.

As one particular example of module 130A, it may be a pre-trained convolutional neural network module to which an image may be applied as input to the input endpoint 131A. Output that indicates features of an applied image may be generated over the module 130A, and provided at output endpoint 133A. The module 130A may be pre-trained based on a plurality of training examples and may have optionally been pre-trained while joined with other modules. The hidden layers 132A may include one or more convolutional layers, pooling layers, weight layers, and/or other layers. In some of those and/or in other implementations, module 130B may be a pre-trained neural network module to which image features may be applied as input to the input endpoint 131B. Output that indicates one or more classes of objects present based on the applied features may be generated over the second module, and provided at output endpoint 133B.

As another particular example of module 130A, the module 130A may be a calibration module to which sensor data may be applied as input to the input endpoint 131A. Output that indicates adjusted sensor data may be generated over the module 130A, and provided at output endpoint 133A.

In response to the endpoints 133A and 131B not being fully compatible, the training engine 116 may train one or both of the modules 130A and 130B by applying training examples to a combined model that joins output endpoint 133A and input endpoint 131B. For example, the training engine 116 may train one or both of the modules 130A and 130B in response to a received request (from request engine 112) to generate a combined model that joins output endpoint 133A and input endpoint 131B.

Figure 2B:
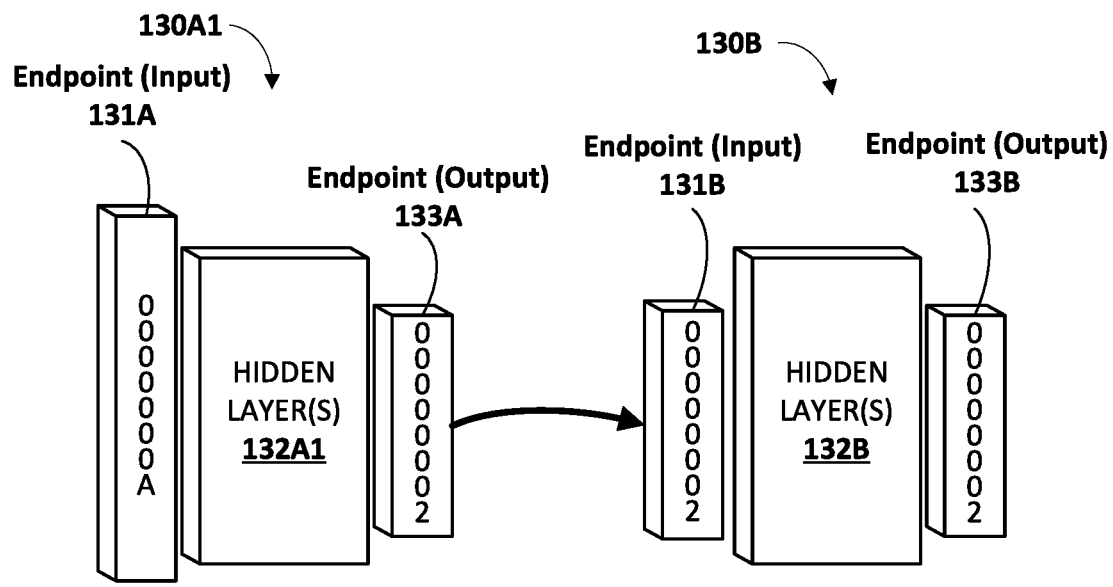
FIGS. 2B, 2C, and 2D, each illustrate a different example of training that may occur to make the two modules of FIG. 2A fully compatible, and each illustrate an example of how version identifier(s) of endpoint(s) of the module(s) may be altered in response to the training.
Figure 2C:
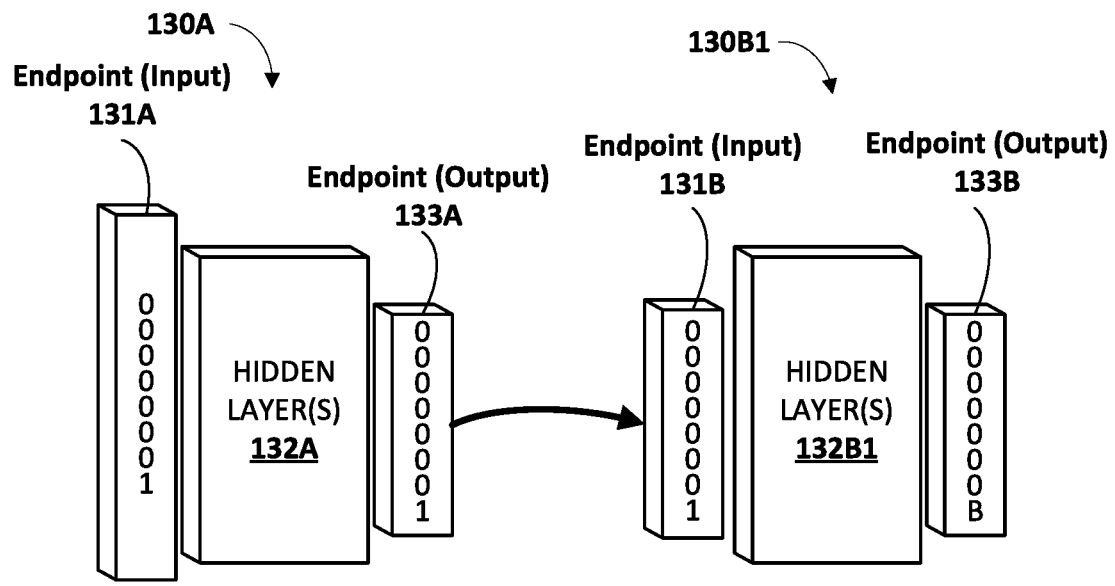
Figure 2D:
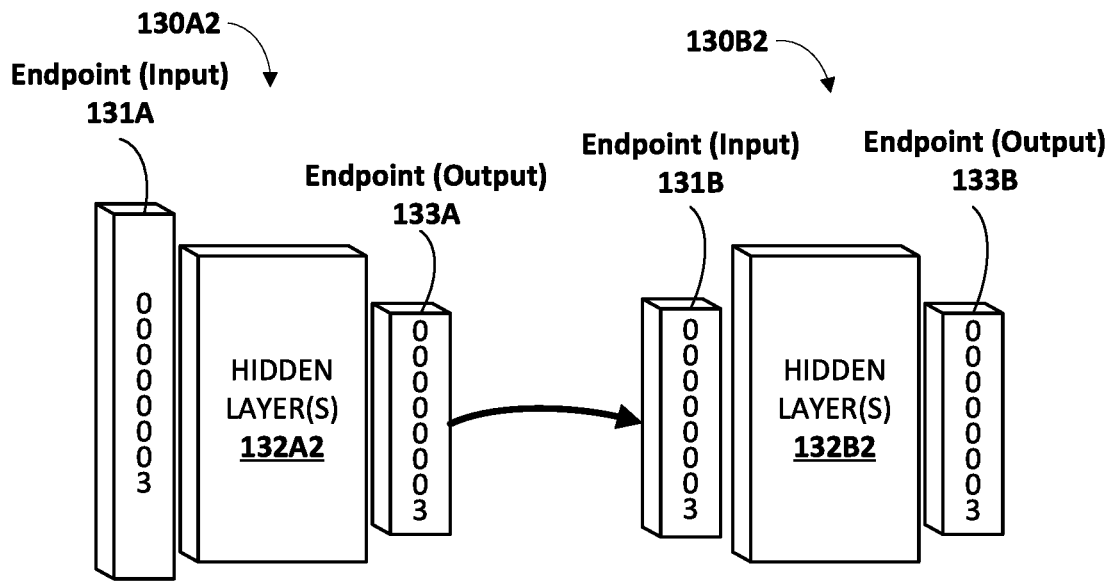

FIGS. 2B, 2C, and 2D, each illustrate a different example of training that training engine 116 may perform to make the two modules 130A and 130B of FIG. 2A fully compatible. FIGS. 2B, 2C, and 2D each also illustrate an example of how version identifier engine 118 may assign version identifier(s) of endpoint(s) of the module(s) in response to the training.

In the examples of FIGS. 2B, 2C, and 2D, when a module is not trained, the version identifier engine 118 does not modify the version identifiers of the endpoints of those modules. In the examples, when a module is trained, the version identifiers of both endpoints are updated. If the other module is fixed when the module is trained, the version identifier of the endpoint joined with that other module is updated to be the same as the version identifier of the endpoint to which it is joined. The version identifier of the other endpoint of the trained module is updated to a different value. If both modules are trained, the version identifier is updated for all of the endpoints, and the same version identifier is used for all of the endpoints.

FIG. 2B shows an example where module 130A is trained while module 130B is fixed. The training of the module 130A creates a refined version 130A1 of the module 130A. The refined version 130A1 includes refined hidden layers 132A1 with weights that have been updated based on the training. The training engine 116 utilizes training examples that are configured for the combined model. For example, the training engine 116 may utilized training examples from database that each have training example inputs that conform the input endpoint 131A and training example outputs that conform to the output endpoint 133B. The training engine 116 applies the training examples to the combined model, backpropagates error across the entirety of the combined model, but only trains the module 130A based on the backpropagation. For example, training engine 116 may apply training example input(s) to the input endpoint 131A, and backpropagate error based on comparison of corresponding training example output(s) to the output(s) generated at output endpoint 133B based on application of the training example input(s).

In response to the training by training engine 116, the version identifier engine 118 assigns a new version identifier ("00000002") to the output endpoint 133A and assigns a new version identifier ("0000000A") to the input endpoint 131A. These new version identifiers are illustrated in FIG. 2B and replace the previous version identifiers ("00000001"). The new version identifier ("00000002") of the output endpoint 133A exactly matches the version identifier of the input endpoint 131B and indicates the refined version 130A1 has been trained while the output endpoint 133A was joined with input endpoint 131B. The new version identifier of the output endpoint 133A can be used to restrict the refined version 130A1 of the module 130A to use in combined models that join the output endpoint 133A with the matching version of the input endpoint 131B. For example, prior to deploying a combined model that includes the output endpoint 133A joined with the input endpoint 131B, the matching engine 114 may first check to ensure that the version identifier of the output endpoint 133A is the same as (or otherwise matches) the version identifier of input endpoint 131B.

The new version identifier ("0000000A") may optionally be selected for the input endpoint 131A based on it not being assigned in database 130 to any output endpoints that have the same datatype and shape as input endpoint 131A. In other words, the version identifier engine 118 may assign that identifier to reflect that when the refined version 130A1 was trained, the input endpoint 131A was not joined to any other endpoint. This may prevent the input endpoint 131A of the refined version and another endpoint of an additional module from being joined and used in a combined model, without first training of the refined version 130A1 and/or the additional module.

In some implementations, the refined version 130A1 may be stored in neural network modules database 130 along with its assigned version identifiers, while also maintaining the module 130A and its assigned version identifiers in the database 130 (e.g., a "copy" of the module 130A may be created before training to create the refined version 130A1).

FIG. 2C shows an example where module 130B is trained while module 130A is fixed. The training of the module 130B creates a refined version 130B1 of the module 130B. The refined version 130B1 includes refined hidden layers 132B1 with weights that have been updated based on the training. The training engine 116 trains the module 130B using training examples that are configured for the combined model. The training engine 116 applies the training examples to the combined model, and backpropagates error across the entirety of the combined model, but only trains the module 130B based on the backpropagation.

In response to the training by training engine 116, the version identifier engine 118 assigns a new version identifier ("00000001") to the input endpoint 131B and assigns a new version identifier ("0000000B") to the output endpoint 133B. These new version identifiers are illustrated in FIG. 2B and replace the previous version identifiers ("00000002")

The new version identifier ("00000001") of the input endpoint 131B exactly matches the version identifier of the output endpoint 133B and indicates that the refined version 130B1 has been trained while the input endpoint 131B was joined with output endpoint 133A. The new version identifier of the input endpoint 131B can be used to restrict the refined version 130B1 of the module 130B to use in combined models that join the input endpoint 131B with the matching version of the output endpoint 133A. The new version identifier ("0000000B") may optionally be selected for the output endpoint 133B based on it not being assigned in database 130 to any output endpoints that have the same datatype and shape as output endpoint 133B. In other words, the version identifier engine 118 may assign that version identifier to reflect that when the refined version 130B1 was trained, the output endpoint 133B was not joined to any other endpoint. This may prevent the output endpoint 133B and another endpoint of an additional module from being joined and used in a combined model, without first training of the refined module 130B1 and/or the additional module.

FIG. 2D shows an example where both of the modules 130A and 130B are trained. The training of the modules 130A and 130B creates refined versions 130A2 and 130B2, of the modules 130A and 130B, that include refined hidden layers 132A2 and 132B2 with updated weights. The training engine 116 utilizes training examples that are configured for the combined model, applies the training examples to the combined model, backpropagates error across the entirety of the combined model, and trains both of the modules 130A and 130B based on the backpropagation.

In response to the training by training engine 116, the version identifier engine 118 assigns a new version identifier ("00000003") to all of the endpoints 131A, 131B, 133A, and 133B, as illustrated in FIG. 2D. The new version identifier replaces the previous version identifiers of the endpoints 131A, 133A, 131B, and 133B— and is unique from any of those previous version identifiers. The new version identifiers can be used to restrict the refined versions 130A2 and 130B2 to being used in a combined model that includes only the refined versions 130A2 and 130B2 as joined in FIG. 2D. In other words, the version identifiers may prevent other versions from being joined and used with the refined versions 130A2 and 130B2 unless further training occurs. In some implementations, the version identifier engine 118 may assign the endpoints 131B and 133A the same version identifier, but assign the endpoint 131A and/or endpoint 133B different version identifier(s). For example, endpoints 131B and 133A may be assigned the new version identifier "00000003", the endpoint 131A assigned a different new version identifier (e.g., "0000000F"), and the endpoint 133B also assigned a different new version identifier (which may be different than the version identifier assigned to endpoint 131A and different from the version identifier assigned to endpoints 131B and 133A).

Figure 3:
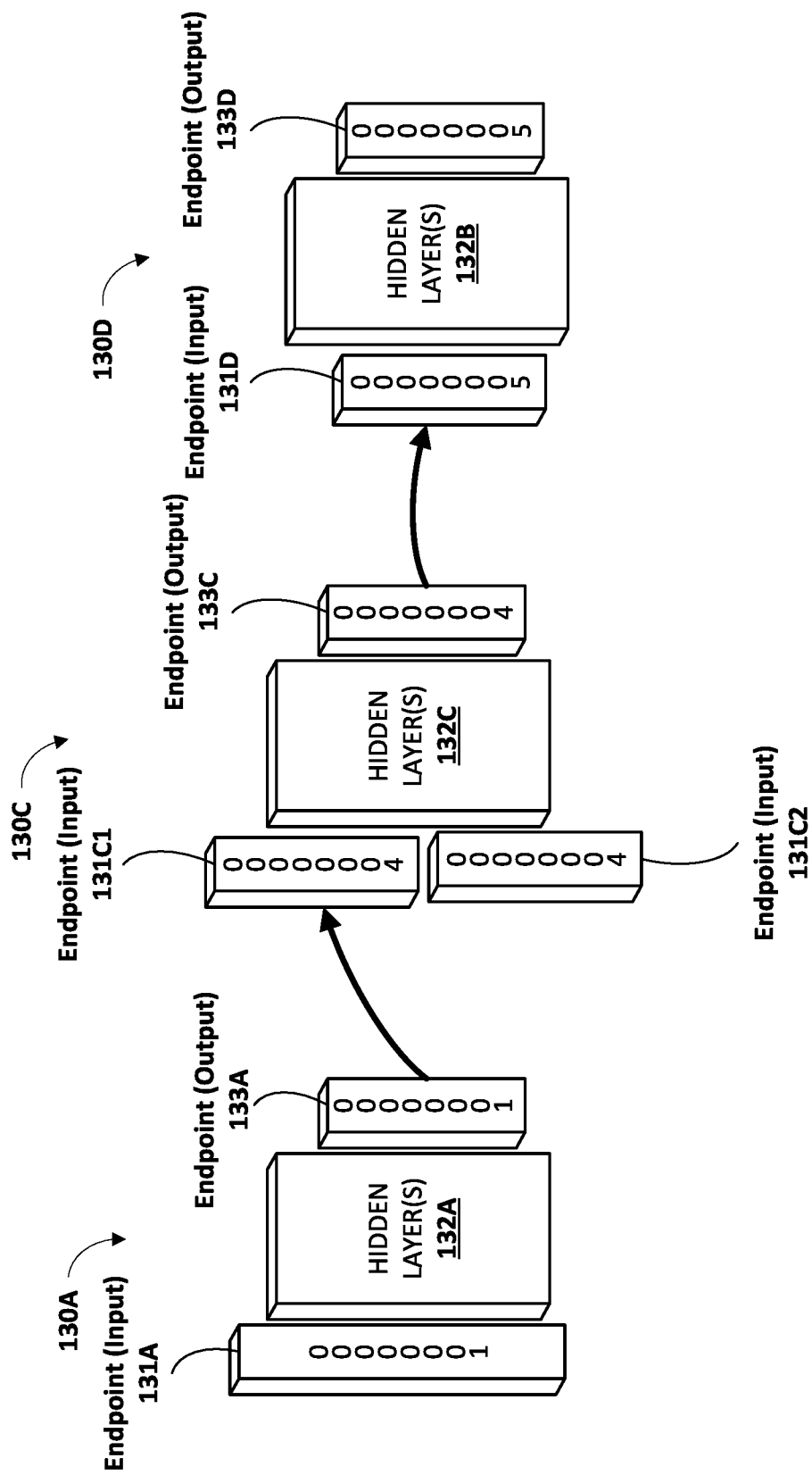
FIG. 3 illustrates three neural network modules, version identifiers assigned to endpoints of the modules, and how compatible endpoints of the modules may be joined.

FIG. 3 illustrates three neural network modules 130A, 130C, and 130D of neural network modules database 130. The module 130A is the same as that illustrated in FIG. 2A. The module 130C includes input endpoints 131C1 and 131C2, an output endpoint 133C, and one or more hidden layers 132C interposed between the input endpoints 131C1, 131C2 and the output endpoint 133C. In other implementations one of the input endpoints 131C1 and 131C2 may be a side input that feeds into a layer of hidden layers 132B that is downstream from an initial layer. The endpoints 131C1, 131C2, and 133C are all illustrated with the same version identifier, "00000004". The module 130D includes input endpoint 131D, and output endpoint 133D, and one or more hidden layers 132D interposed between the endpoints 131D and 133D. The endpoints 131D and 133D are both illustrated with the same version identifier, "00000005".

The arrow between output endpoint 133A and input endpoint 131C1 indicates that those endpoints have been joined, and the arrow between output endpoint 133C and input endpoint 131D indicates that those endpoints have been joined. In FIG. 3, the endpoints 133A and 131C1 are compatible (i.e., have the same shape and datatype), but are not fully compatible. Likewise, the endpoints 133C and 131D are compatible, but are not fully compatible.

In response to the lack of full compatibility of the endpoints, the training engine 116 may train the modules 130A, 130C, and/or 130D in various fashions by applying training examples to a combined model that joins the modules 130A, 130C, and 130D in a manner as indicated by the arrows of FIG. 3.

As one example, training engine 116 may train modules 130A and 130D while maintaining module 130C fixed. The training of the modules 130A and 130D creates refined versions of those modules. The training engine 116 utilizes training examples that are configured for the combined model (i.e., that have training example inputs that conform the input endpoint 131A and the input endpoint 131C2 and training example outputs that conform to the output endpoint 133D). The training engine 116 applies the training examples to the combined model, backpropagates error across the entirety of the combined model, but only trains the modules 130A and 130D based on the backpropagation. In response to such an example of training by training engine 116, the version identifier engine 118 may assign, to the output endpoint 133A, a new version identifier of "00000004" that replaces the previous version identifier ("00000001") and that exactly matches the version identifier of the input endpoint 131C1. In response to such an example of training by training engine 116, the version identifier engine 118 may also assign, to the input endpoint 131D, a new version identifier of "00000004" that replaces the previous version identifier ("00000005") and exactly matches the version identifier of the output endpoint 133C. The version identifier engine 118 may not modify the version identifiers assigned to the endpoints 131C1, 131C2, and 133C of module 130C. The new version identifier of the output endpoint 133A can be used to restrict the refined version of the module 130A to use in combined models that join the output endpoint 133A with the matching version of the input endpoint 131C1. It is noted that some of those combined models may optionally join the output endpoint 133C to an input endpoint that is different than input endpoint 131D (e.g., a fully compatible input endpoint of a module that is not a version of module 130B). The new version identifier of the input endpoint 131D can also be used to restrict the refined version of the module 130D to use in combined models that join the input endpoint 131D with the output endpoint 133C. It is noted that some of those combined models may optionally join the input endpoint 131C1 to an output endpoint that is different than output endpoint 133A (e.g., a fully compatible output endpoint of a module that is not a version of the module 130A).

As another example, training engine 116 may train module 130C while maintaining modules 130A and 130D fixed. The training of the module 130C creates a refined version of that module. The training engine 116 utilizes training examples that are configured for the combined model. The training engine 116 applies the training examples to the combined model, backpropagates error across the entirety of the combined model, but only trains the module 130C based on the backpropagation. In response to such an example of training by training engine 116, the version identifier engine 118 may assign, to the output endpoint 133C, a new version identifier of "00000005" that replaces the previous version identifier ("00000004") and exactly matches the version identifier of the input endpoint 131D. In response to such an example of training by training engine 116, the version identifier engine 118 may also assign, to the input endpoint 131C1, a new version identifier of "00000001" that replaces the previous version identifier ("00000004") and exactly matches the version identifier of the output endpoint 133A. The version identifier engine 118 may not modify the version identifiers assigned to the endpoints of modules 130A and 130B. The new version identifiers of the output endpoint 133C can be used to restrict the refined version of the module 130C to use in combined models that join the output endpoint 133C with the matching version of the input endpoint 131D. Likewise, the new version identifier of the input endpoint 131C1 can be used to restrict the refined version of the module 130C to use in combined models that join the input endpoint 131C1 with the output endpoint 133A.

As yet another example, training engine 116 may train all of modules 130A, 130B, and 130C. In response to such an example of training by training engine 116, the version identifier engine 118 may assign the same new version identifier to all of the endpoints of modules 130A, 130B, and 130C.

Figure 4:
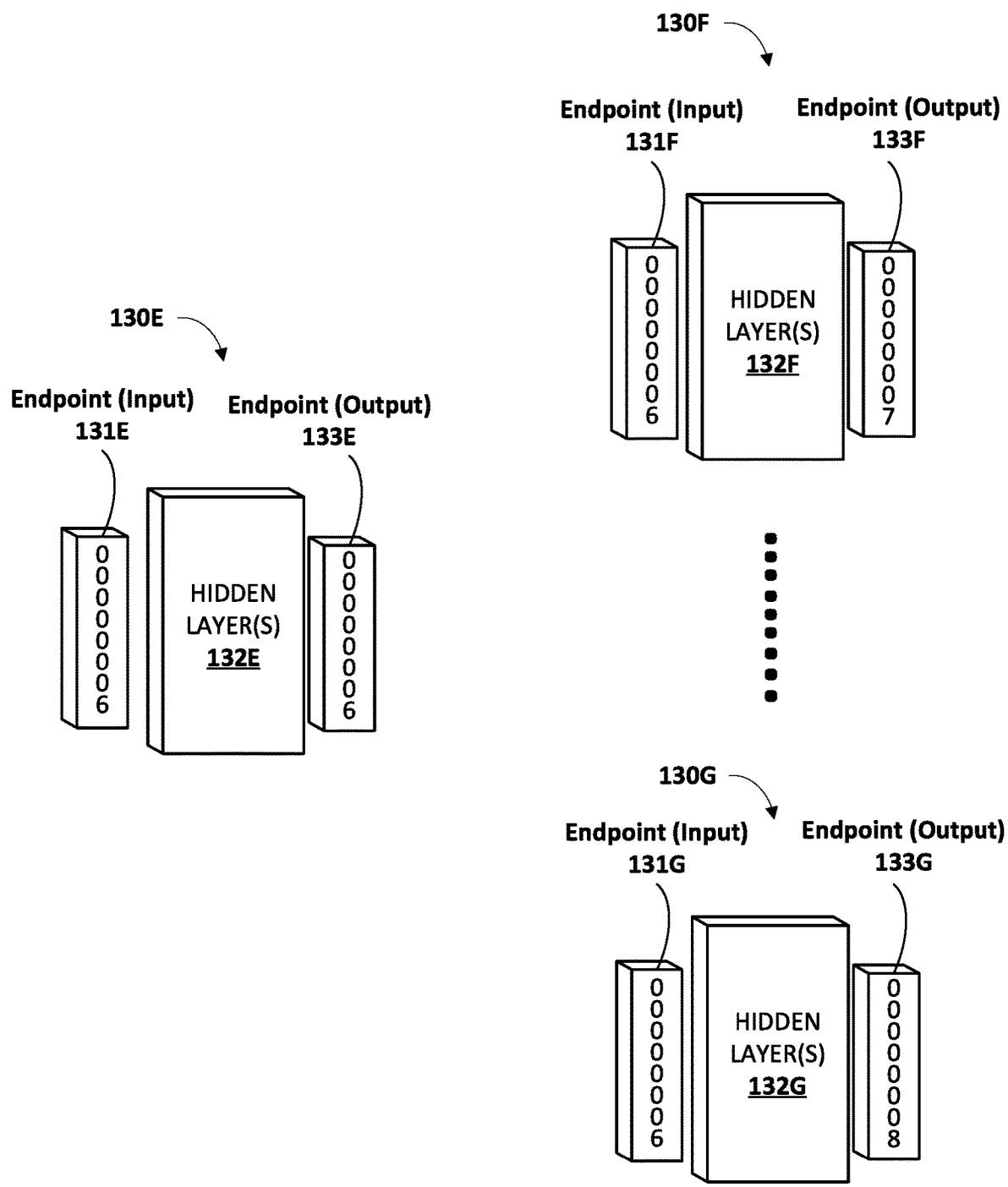
FIG. 4 illustrates a neural network module and a plurality of additional neural network modules that each include an endpoint that is fully compatible with one of the endpoints of the module.

FIG. 4 illustrates a neural network module 130E and a plurality of additional neural network modules, two of which are illustrated as module 130F and module 130G (the others are indicated by the ellipsis). The additional modules each include an input endpoint that is fully compatible with the output endpoint 133E of module 130E. For example, module 130F includes an input endpoint 131F that, as indicated by the illustrated version identifier, is fully compatible with the output endpoint 133E. The module 130F also includes hidden layer(s) 132F and an output endpoint 133F. Also, for example, module 130G includes an input endpoint 131G that, as indicated by the illustrated version identifier, is fully compatible with the output endpoint 133E. The module 130G also includes hidden layer(s) 132G and an output endpoint 133G. The additional modules may have each been trained while joined to the output endpoint 133E, while keeping the module 130E fixed. This may enable the same module 130E to be interchangeably used with any of the additional modules without requiring any further training—or with requiring less training than would have been required had the additional modules not been previously trained while joined to the output endpoint 133E, and assigned a version identifier as a result of the training.

Particular examples of neural network modules and particular examples of joining and/or training neural network modules are illustrated in FIG. 4 and other figures herein. However, it is understood that variations are contemplated and within the scope of this disclosure. For example, in some implementations a neural network module may have multiple distinct output endpoints that may be joined to a single input endpoint of another neural network module. Also, for example, in some implementations an output endpoint of a first neural network module and an output endpoint of a second neural network module may be joined to a single input endpoint of another neural network module. As yet another example, in some implementations, a plurality of output endpoints (from one or more neural network modules) may be joined to a plurality of input endpoints of one or more additional neural network modules.

Figure 5:
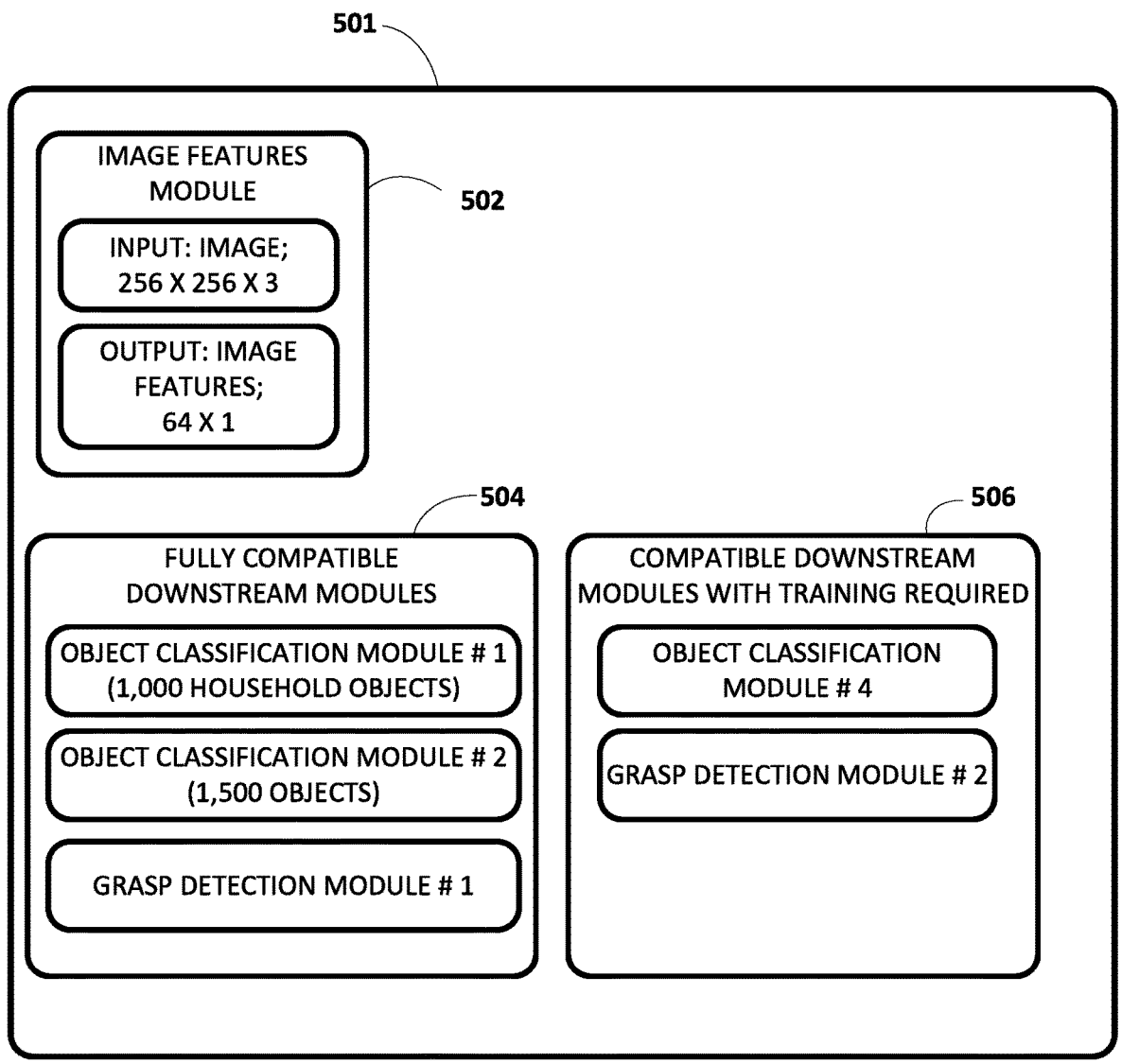
FIG. 5 illustrates an example of a graphical user interface that may be utilized in various implementations disclosed herein.

FIG. 5 illustrates a graphical user interface that may be utilized in various implementations disclosed herein. The graphical user interface may be presented to a user via a user interface output device of one of the client computing device(s) 105 and a user may interact with the graphical user interface via one or more user interface input devices of the client computing device(s) 105. In FIG. 5, a graphical element 502 illustrates that the user has selected, via the graphical user interface, an "image features module" that has an input endpoint with the illustrated datatype and shape and an output endpoint with the illustrated datatype and shape. For example, the user may have chosen the "image features module" via a dropdown menu, via selection of a search result after issuing a search, or via browsing a collection of available modules.

The graphical element 504 displays three separate "downstream modules" (e.g., connectable to an output endpoint of the "image features module") that are each fully compatible with the "image features module". In some implementations, the matching engine 114 may identify the modules of graphical element 504 based on those modules having version identifiers assigned to their input endpoints that match the version identifier assigned to the output endpoint of the "image features module". A user may select, via user interface input, one of the modules of graphical element 504 to join with the "image features module" in a combined model (optionally with other fully compatible module(s) selected via the graphical user interface). In some of those implementations, the combined model may be provided by the neural network module system 110 for use in a robot or other apparatus. In some versions of those implementations, the combined model may be provided without any further training of the combined model—or may be provided with less training of the combined model than would be required had the version identifiers not indicated the selected downstream module as fully compatible.

The graphical element 506 displays two separate "downstream modules" that are each compatible (but not fully compatible) with the "image features module". In some implementations, the matching engine 114 may identify the modules of graphical element 504 based on those modules having input endpoints with a shape and datatype that match the shape and datatype of the output endpoint of the "image features module". A user may select, via user interface input, one of the modules of graphical element 506 to join with the "image features module" in a combined model (optionally with other compatible module(s) selected via the graphical user interface). In some of those implementations, the combined model may be provided for use in a robot or other apparatus. In some version of those implementations, the combined model may be trained by training engine 116 prior to use of the combined model and may optionally be trained in response to determining that the version identifier of an input endpoint of the selected downstream module does not match the version identifier of the output endpoint of the "images features module". The training performed in response to determining that the endpoints are not fully compatible (e.g., have different version identifiers) may be more extensive than any training performed had the endpoints been fully compatible.

Figure 6:
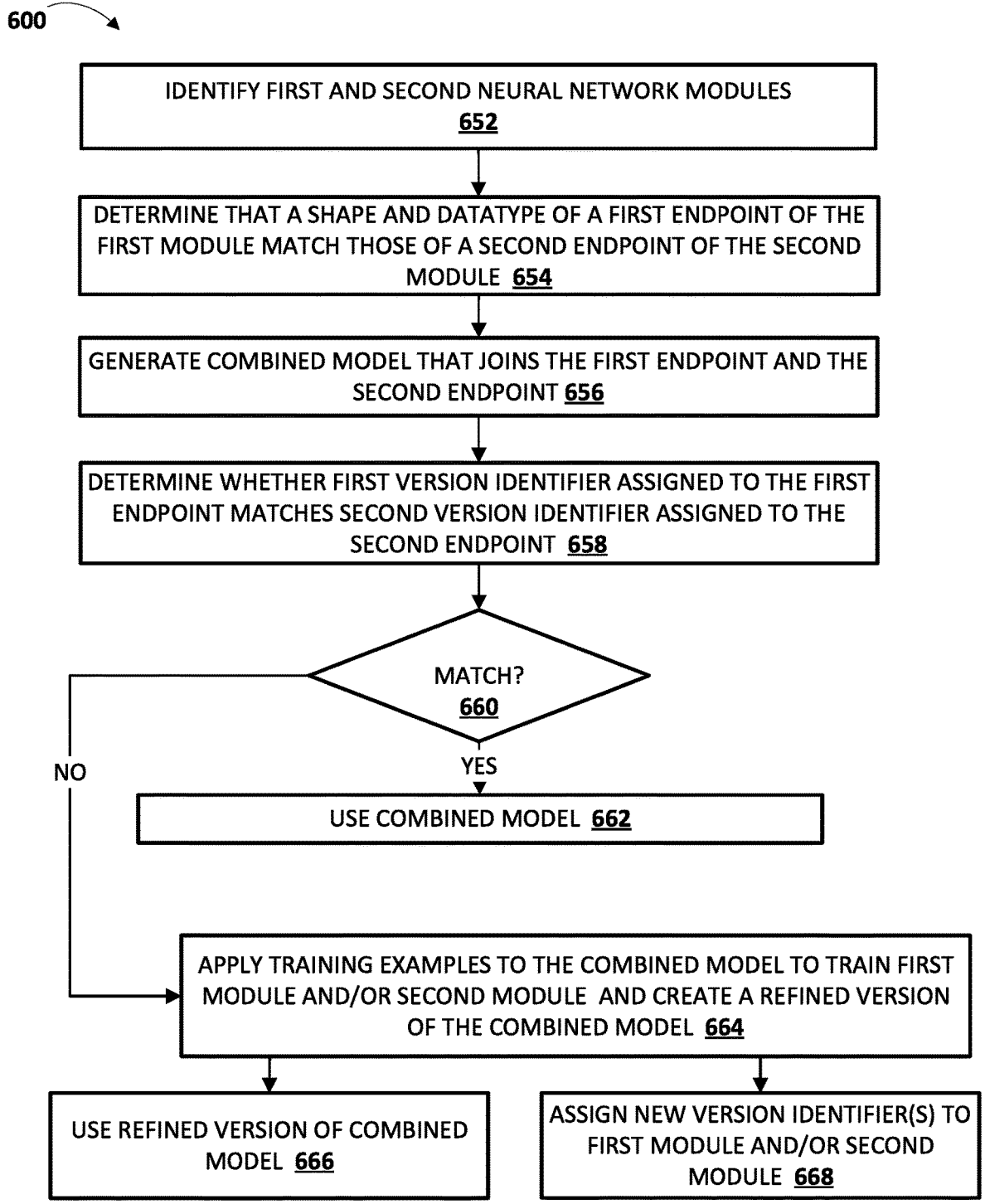
FIG. 6 is a flowchart illustrating an example method according to various implementations disclosed herein.

FIG. 6 is a flowchart illustrating an example method 600 according to various implementations disclosed herein. For convenience, the operations of the flow chart are described with reference to a system that performs the operations. This system may include one or more components of a computer system, such as one or more processors of a robot (e.g., robot 180A or 180B), one or more processors of a client computing device, and/or one or more processors of neural network module system 110 (when one or more aspects are separate from robot(s) and/or client computing device(s)). Moreover, while operations of method 600 are shown in a particular order, this is not meant to be limiting. One or more operations may be reordered, omitted or added.

At block 652, the system identifies a first neural network module and a second neural network module. In some implementations, the system identifies the modules in response to a request to combine the modules.

At block 654, the system determines that a shape and datatype of a first endpoint of the first module match those of a second endpoint of the second module.

At block 656, the system generates a combined model that joins the first endpoint and the second endpoint. It is noted that in some implementations, block 656 may occur after blocks 658 and 660.

At block 658, the system determines whether a first version identifier assigned to the first endpoint matches a second version identifier assigned to the second endpoint. In some implementations, the system uses exact and/or soft matching techniques in determining whether version identifiers match. In some implementations, the system uses a hash table and/or other data structure that maps version identifiers to one another to determine whether version identifiers match.

If it is determined at block 658 that the first version identifier and the second version identifier match, at block 660 the system proceeds to block 662. At block 662 the combined model generated at block 656 is used. For example, the combined model may be deployed for active use in a robot and/or other apparatus and/or actively used in a robot and/or other apparatus. Active use of a combined model in an apparatus may include applying input to the combined model, generating output over the model based on the applied input, and using the generated output to control one or more further actions of the apparatus. In some implementations, the combined model may be used without any further training of the modules of the combined model. In some other implementations, the combined model may be used after some further training of the modules of the combined model, but the extent of the training (e.g., the quantity of training examples applied during the training) may be less extensive than training of block 664 (described below).

If instead at block 658 it is determined that the first version identifier and the second version identifier do not match, at block 660 the system proceeds to block 664.

At block 664, the system applies training examples to the combined model to train the first module and/or the second module, thereby creating a refined version of the combined model. In some implementations, the system may perform one or more steps of the method 800 of FIG. 8 in performing block 664. The system then proceeds to blocks 666 and 668.

At block 666, the system uses the refined version of the combined model. For example, the combined model may be deployed for active use in a robot and/or other apparatus and/or actively used in a robot and/or other apparatus.

At block 668, the system assigns one or more new version identifiers to the first module and/or the second module in response to the training of block 664. In some implementations, the system assigns the new version identifier(s) to one or both endpoints of the first module and/or to one or both endpoints of the second module. For example, if at block 664 the first module is trained while the second module remains fixed, the system may assign a new version identifier to the first endpoint. For instance, the new version identifier may replace the previous version identifier of the first endpoint and may optionally match the previously assigned version identifier of the second endpoint. As another example, if at block 664 the second module is trained while the first module remains fixed, the system may assign a new version identifier to the second endpoint. For instance, the new version identifier may replace the previous version identifier of the second endpoint and may optionally match the previously assigned version identifier of the first endpoint. As yet another example, if at block 664 both modules are trained, the system may assign a new version identifier to both the first and second endpoints, where the new version identifier replaces version identifiers previously assigned to those endpoints.

Although examples described above with respect to method 600 are described with respect to a first and second module for the sake of simplicity, it is understood that additional modules may be included in one or more of the blocks of method 600.

Figure 7:
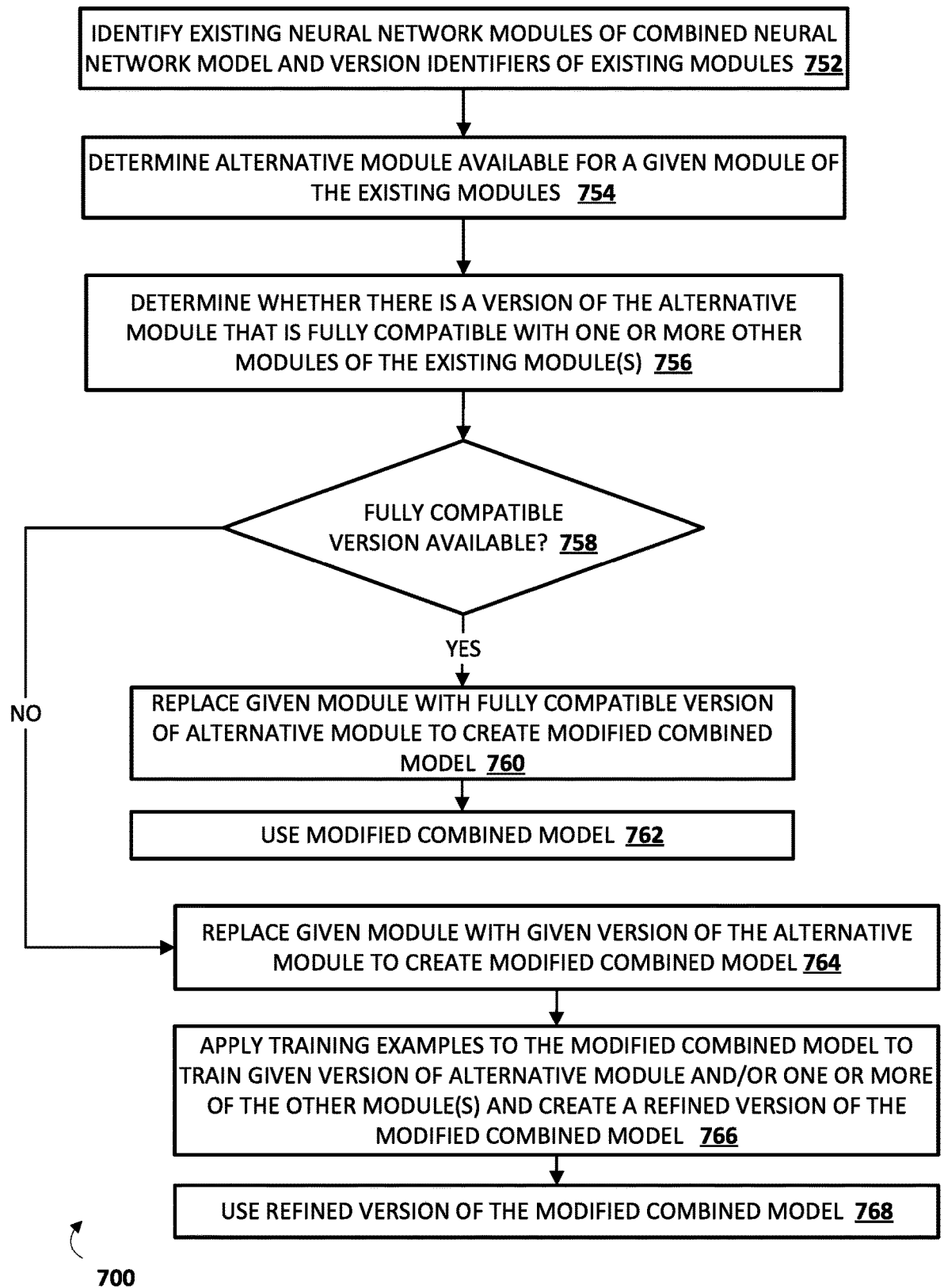
FIG. 7 is a flowchart illustrating another example method according to various implementations disclosed herein.

FIG. 7 is a flowchart illustrating another example method 700 according to various implementations disclosed herein. For convenience, the operations of the flow chart are described with reference to a system that performs the operations. This system may include one or more components of a computer system, such as one or more processors of a robot (e.g., robot 180A or 180B), one or more processors of a client computing device, and/or one or more processors of neural network module system 110 (when one or more aspects are separate from robot(s) and/or client computing device(s)). Moreover, while operations of method 700 are shown in a particular order, this is not meant to be limiting. One or more operations may be reordered, omitted or added.

At block 752, the system identifies existing neural network modules of a combined neural network model, and identifies version identifiers of those existing modules. For example, the system may identify a combined model that includes modules A, B, and C, with an output endpoint of module A joined to an input endpoint of module B, and an output endpoint of module B joined to an input endpoint of module C. The system may further identify version identifiers for at least the joined endpoints of the combined model.

At block 754, the system determines that an alternative module is available for a given module of the existing modules. The given module may be an initial/beginning module of the combined model, an end module of the combined model, or an intermediary module of the combined model. In some implementations, determining that an alternative module is available may include determining that a more up to date model of the given module is available. For example, the more up to date model may have endpoints that are all of the same datatype and shape as those of the given module, but the more up to date model may have improved performance due to more training, different training techniques, etc. In some implementations, determining that an alternative module is available may include determining that an alternative module with different functionality is available. For example, the given module may detect 500 classes of household objects whereas the alternative module may detect 500 classes of industrial objects. Also, for example, the given module may detect 500 classes of household objects whereas the alternative module may predict captions to apply to objects. As yet another example, the given module may predict grasping parameters based on image features, whereas the alternative module may classify objects.

At block 756, the system determines whether there is a version of the alternative module that is fully compatible with one or more other modules of the existing module(s). For example, the system may identify the version identifier(s) of the endpoint(s) that are joined to the given module, and determine a version of the alternative module is available that is fully compatible if that version has corresponding endpoint(s) that match those version identifier(s). For instance, assume module A is the given module, an output endpoint of module A is joined to an input endpoint of module B, and that the input endpoint of module A is not joined to any other modules. The system may determine whether there is a version of the alternative module that has an output endpoint with an assigned version identifier that matches the assigned version identifier of the input endpoint of module B. If so, that version is fully compatible. If not, there are no fully compatible versions.

If, at block 758, the system determines a fully compatible version is available, the system proceeds to block 760 where the system replaces the given module with the fully compatible version of the alternative module to create a modified combined model. The system then proceeds to block 762 and uses the modified combined model. In some implementations, the system uses the modified combined model without any further training of the combined model—or with less training than would be required at block 766 (described below).

If, on the other hand, the system determines at block 758 that a fully compatible version is not available, the system proceeds to block 764 where the system replaces the given module with a given version of the alternative module to create a modified combined model. The given version of the alternative module may optionally be any one of the available versions. The system then proceeds to block 766 and applies training examples to the modified combined model to train the given version of the alternative module and/or one or more of the other modules and create a refined version of the modified combined model. In some implementations, the system may perform one or more steps of the method 800 of FIG. 8 in performing block 766. The system then proceeds to block 768 and uses the refined version of the modified combined model.

Figure 8:
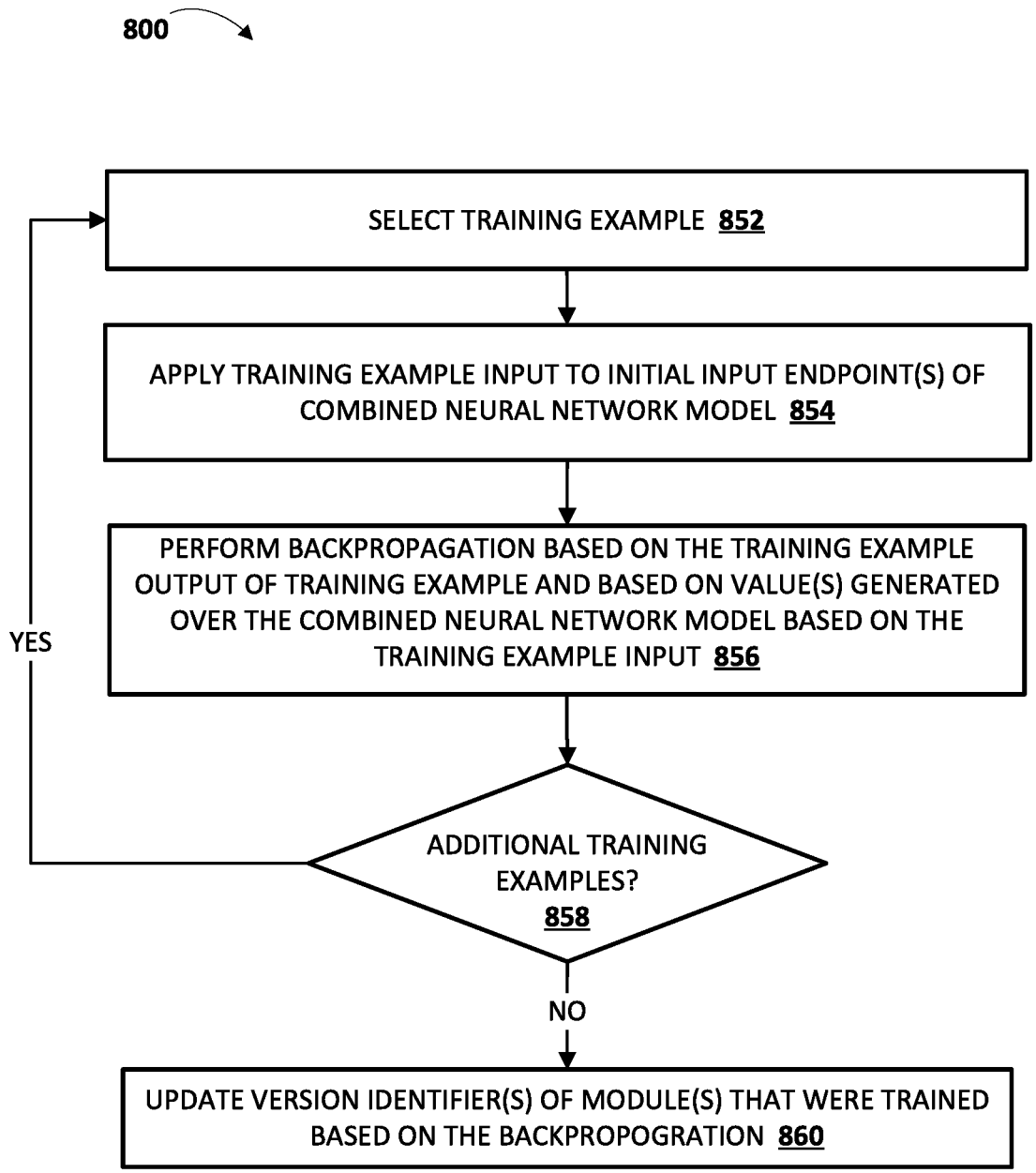
FIG. 8 is a flowchart illustrating another example method according to various implementations disclosed herein.

FIG. 8 is a flowchart illustrating another example method 800 according to various implementations disclosed herein. For convenience, the operations of the flow chart are described with reference to a system that performs the operations. This system may include one or more components of a computer system, such as one or more processors of a robot (e.g., robot 180A or 180B), one or more processors of a client computing device, and/or one or more processors of neural network module system 110 (when one or more aspects are separate from robot(s) and/or client computing device(s)). Moreover, while operations of method 800 are shown in a particular order, this is not meant to be limiting. One or more operations may be reordered, omitted or added.

At block 852, the system selects a training example. For example, the system may select a training example based on it belonging to a group of training examples that conform to a combined neural network model to be trained.

At block 854, the system applies training example input of the training example to one or more initial input endpoints of a combined neural network model that includes a plurality of neural network modules.

At block 856, the system performs backpropagation based on the training example output of the training example and based on one or more values generated over the combined neural network model based on the application of the training example input at block 854. In some implementations, the system performs backpropagation over the combined model, but only trains (e.g., updates values of) a subset (e.g., only one) of the modules of the combined model. In some other implementations, the system performs backpropagation over the combined model and trains all of the modules of the combined model.

At block 858, the system determines whether there are additional training examples. If the system determines there are additional training examples, the system returns to block 852 and selects another training example. In some implementations, determining whether there are additional training examples may include determining whether there are any remaining training examples that have not been utilized to train the combined model. In some implementations, determining whether there are additional training examples may additionally or alternatively include determining whether a threshold number of training examples have been utilized and/or other criteria has been satisfied.

If the system determines there are not additional training examples and/or that some other criteria has been met, the system concludes the training and proceeds to block 860.

At block 860, the system updates version identifier(s) of the module(s) that were trained during one or more iterations of block 856. For example, the system may update the version identifier of an endpoint of a module if that module was trained and that endpoint was joined to an endpoint of another module in the combined model. For instance, the system may update the version identifier of the endpoint of the module to match that of the endpoint of the other module, if that other module was fixed (not trained) during the iterations of block 856. Also, for instance, if a first endpoint of a first module is joined to a second endpoint of a second module in the combined model, and both modules were trained during iterations of block 856, new matching version identifiers may be assigned to both the first endpoint and the second endpoint.

Figure 9:
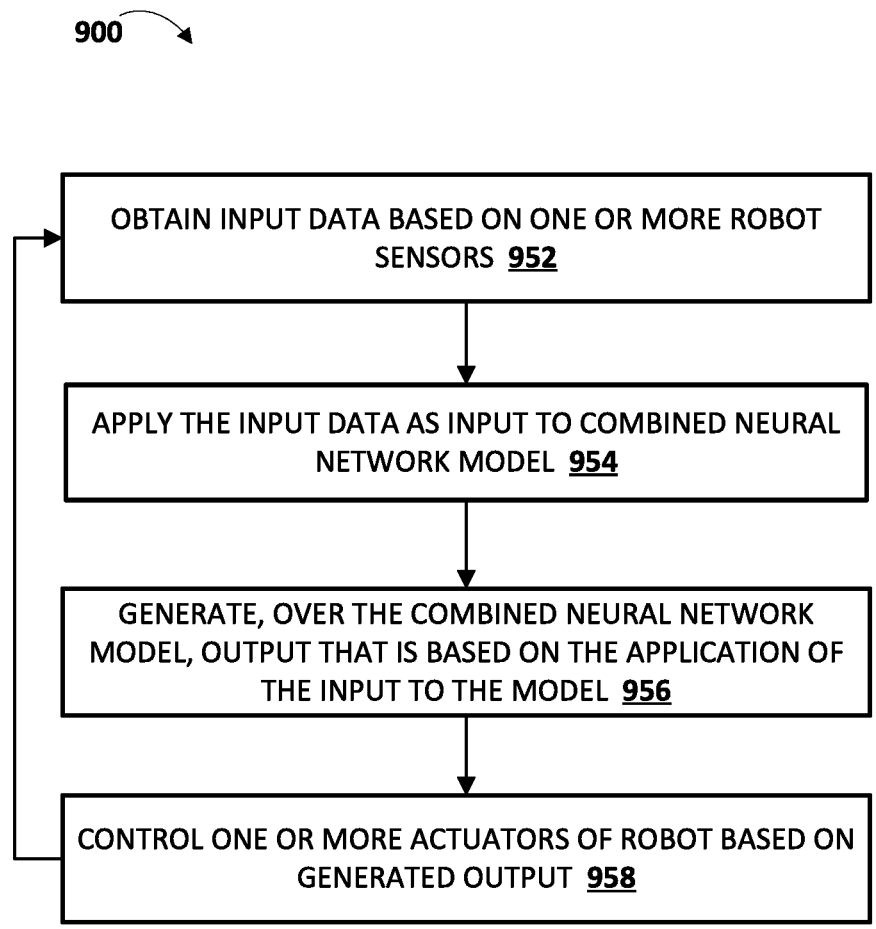
FIG. 9 is a flowchart illustrating another example method according to various implementations disclosed herein.

FIG. 9 is a flowchart illustrating another example method 900 according to various implementations disclosed herein. For convenience, the operations of the flow chart are described with reference to a system that performs the operations. This system may include one or more components of a computer system, such as one or more processors of a robot (e.g., robot 180A or 180B), one or more processors of a client computing device, and/or one or more processors of neural network module system 110 (when one or more aspects are separate from robot(s) and/or client computing device(s)). Moreover, while operations of method 900 are shown in a particular order, this is not meant to be limiting. One or more operations may be reordered, omitted or added.

Method 900 illustrates an example of active use of a combined model by a robot. Method 900 is one example of a method that may be performed at one or more of blocks 662 and 666 of FIG. 6 and/or blocks 758 and 768 of FIG. 7.

At block 952, the system obtains input data based on one or more robot sensors.

At block 954, the system applies the input data as input to a combined neural network model.

At block 956, the system generates, over the combined neural network model, output that is based on the application of the input to the model at block 954.

At block 958, the system controls one or more actuators of the robot based on the generated output. For example, the system may generate one or more motion commands based on the generated output. For instance, the motion commands may cause one or more of actuators that control the pose of an end effector of a robot to actuate, thereby changing the pose of the end effector.

Figure 10:
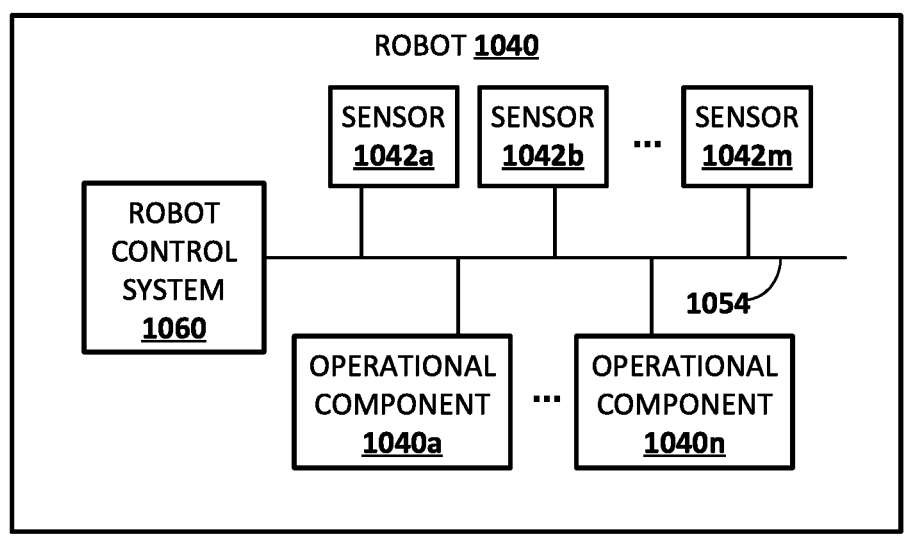
FIG. 10 schematically depicts an example architecture of a robot.

FIG. 10 schematically depicts an example architecture of a robot 1040. The robot 1040 includes a robot control system 1060, one or more operational components 1040a-1040n, and one or more sensors 1042a-1042m. The sensors 1042a-1042m may include, for example, vision sensors, light sensors, pressure sensors, pressure wave sensors (e.g., microphones), proximity sensors, accelerometers, gyroscopes, thermometers, barometers, and so forth. While sensors 1042a-m are depicted as being integral with robot 1020, this is not meant to be limiting. In some implementations, sensors 1042a-m may be located external to robot 1020, e.g., as standalone units.

Operational components 1040a-1040n may include, for example, one or more end effectors and/or one or more servo motors or other actuators to effectuate movement of one or more components of the robot. For example, the robot 1020 may have multiple degrees of freedom and each of the actuators may control actuation of the robot 1020 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1060 may be implemented in one or more processors, such as a CPU, GPU, and/or other controller(s) of the robot 1020. In some implementations, the robot 1020 may comprise a "brain box" that may include all or aspects of the robot control system 1060. For example, the brain box may provide real time bursts of data to the operational components 1040a-n, with each of the real time bursts comprising a set of one or more control commands that dictate, inter alia, the parameters of motion (if any) for each of one or more of the operational components 1040a-n. In some implementations, the robot control system 1060 may perform one or more aspects of methods 600, 700, 800, and/or 9000 described herein.

As described herein, in some implementations all or aspects of the control commands generated by robot control system 1060 may be based on output of a combined model. Although robot control system 1060 is illustrated in FIG. 10 as an integral part of the robot 1020, in some implementations, all or aspects of the robot control system 1060 may be implemented in a component that is separate from, but in communication with, robot 1020. For example, all or aspects of robot control system 1060 may be implemented on one or more computing devices that are in wired and/or wireless communication with the robot 1020, such as computing device 1110.

Figure 11:
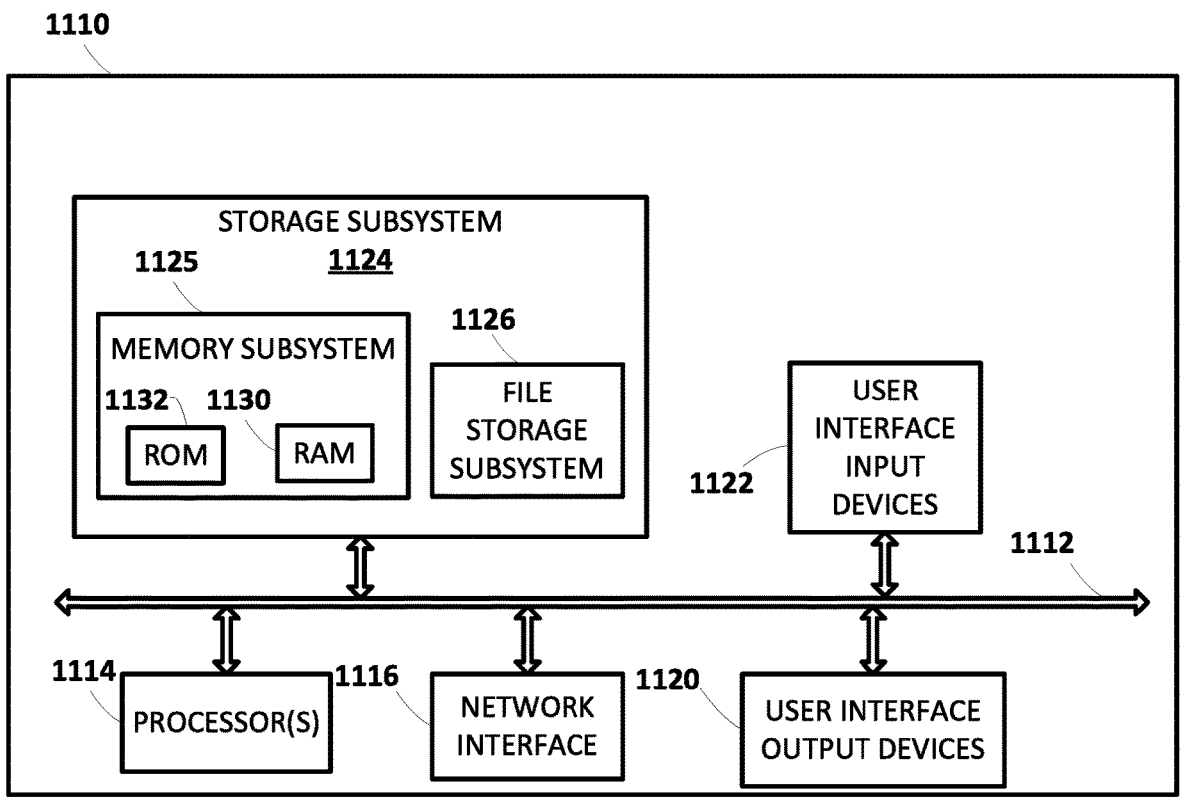
FIG. 11 schematically depicts an example architecture of a computing device.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the method of FIGS. 6, 7, 8, and/or 9.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving a selection of a neural network (NN) module, the selection being made, by a user and via a graphical user interface (GUI) rendered at a client device of the user;
        wherein the NN module has an input endpoint and an output endpoint, the output endpoint having a shape that defines dimensions of the output endpoint;
    determining that a first downstream NN module is fully compatible with the NN module, wherein determining that the first downstream NN module is fully compatible with the NN module comprises:
        determining that a first input endpoint, of the first downstream NN module, has the shape of the output endpoint, and
        determining that previous compatible training of the first downstream NN module occurred, the previous compatible training of the first downstream NN module being training of the first downstream NN module when the first downstream NN module was previously joined with the NN module;
    in response to the selection of the NN module, and in response to determining that the first downstream NN module is fully compatible with the NN module:
        causing a first selectable graphical element, that describes the first downstream NN module, to be rendered at the GUI,
            wherein the first selectable graphical element is selectable, by the user and via the GUI, to generate a combined neural network model that joins the output endpoint of the NN module with the first input endpoint of the first downstream NN module.

2. The method of claim 1, further comprising, in response to the selection of the NN module, and in response to determining that the first downstream NN module is fully compatible with the NN module:
    causing the first selectable graphical element to be rendered along with an indication that the first downstream NN module is fully compatible with the NN module.

3. The method of claim 1, further comprising:
    determining that a second downstream NN module is fully compatible with the NN module, wherein the second downstream NN module differs from the first downstream NN module, and where determining that the second downstream NN module is fully compatible with the NN module comprises:
        determining that a second input endpoint, of the second downstream NN module, has the shape of the output endpoint, and
        determining that the second downstream NN module has been trained when previously joined with the NN module;
    in response to the selection of the NN module, and in response to determining that the second downstream NN module is fully compatible with the NN module:
        causing a second selectable graphical element, that describes the second downstream NN module, to be rendered at the GUI along with the first graphical element that describes the first downstream NN module,
            wherein the second selectable graphical element is selectable, by the user and via the GUI, to generate an alternate combined neural network model that joins the output endpoint of the NN module with the second input endpoint of the second downstream NN module.

4. The method of claim 3, wherein the second downstream NN module differs from the first downstream NN module at least in that it has different functionality than the first downstream NN module.

5. The method of claim 4, wherein the NN module is an image features module, the first downstream NN module is an object classification module, and the second downstream NN module is a grasp detection module.

6. The method of claim 3, further comprising:
    determining that a third downstream NN module is compatible with the NN module, but not fully compatible with the NN module, wherein determining that the third downstream NN module is compatible with the NN module, but not fully compatible with the NN module comprises:
        determining that a third input endpoint, of the third downstream NN module, has the shape of the output endpoint, and
        determining that the third downstream NN module has not been trained when previously joined with the NN module;
    in response to the selection of the NN module, and in response to determining that the third downstream NN module is compatible with the NN module, but not fully compatible with the NN module:
        causing a third selectable graphical element, that describes the third downstream NN module, to be rendered at the GUI, along with the first graphical element that describes the first downstream NN module, and along with the second graphical element that describes the second downstream NN module,
            wherein the third selectable graphical element is selectable, by the user and via the GUI, to generate a further alternate combined neural network model that joins the output endpoint of the NN module with the third input endpoint of the first downstream NN module, and that requires training, when joined with the NN module, prior to use.

7. The method of claim 6, further comprising, in response to the selection of the NN module, and in response to determining that the third downstream NN module is compatible with the NN module, but not fully compatible with the NN module:

causing the third selectable graphical element to be rendered along with an indication that the third downstream NN module is not fully compatible with the NN module.

8. The method of claim 1, wherein determining that the first downstream NN module has been trained when previously joined with the NN module comprises:
determining that a version identifier assigned to the NN module matches a first version identifier assigned to the first downstream NN module.

9. The method of claim 8, wherein the version identifier and the first version identifier each comprises a corresponding sequence of numbers and/or letters.

10. The method of claim 1, further comprising:
determining that a second downstream NN module is compatible with the NN module, but not fully compatible with the NN module, wherein determining that the second downstream NN module is compatible with the NN module, but not fully compatible with the NN module comprises:
determining that a second input endpoint, of the second downstream NN module, has the shape of the output endpoint, and
determining that the second downstream NN module has not been trained when previously joined with the NN module;
in response to the selection of the NN module, and in response to determining that the second downstream NN module is compatible with the NN module, but not fully compatible with the NN module:
causing a second selectable graphical element, that describes the second downstream NN module, to be rendered at the GUI, along with the first graphical element that describes the first downstream NN module,
wherein the second selectable graphical element is selectable, by the user and via the GUI, to generate a further alternate combined neural network model that joins the output endpoint of the NN module with the second input endpoint of the first downstream NN module, and that requires training, when joined with the NN module, prior to use.

11. The method of claim 1, wherein the NN module is an image features module.

12. The method of claim 11, wherein the first downstream NN module is an object classification module.

13. A system comprising:
one or more computer readable media storing a neural network (NN) module and a first downstream NN module,
wherein the NN module has an input endpoint and an output endpoint, the output endpoint having a shape that defines dimensions of the output endpoint; one or more processors;
memory operably coupled with one or more of the processors, wherein the memory stores instructions that are executable by one or more of the processors to cause one or more of the processors to:
receive a selection of a graphical representation of the NN modules, the selection being made, by a user and via a graphical user interface (GUI) rendered at a client device of the user;
determine that the first downstream NN module is fully compatible with the NN module, wherein in determining that the first downstream NN module is fully compatible with the NN module one or more of the processors are to:

determine that a first input endpoint, of the first downstream NN module, has the shape of the output endpoint, and
determine that previous compatible training of the first downstream NN module occurred, the previous compatible training of the first downstream NN module being training of the first downstream NN module when the first downstream NN module was previously joined with the NN module;
in response to the selection of the NN module, and in response to determining that the first downstream NN module is fully compatible with the NN module:
cause a first selectable graphical element, that describes the first downstream NN module, to be rendered at the GUI,
wherein the first selectable graphical element is selectable, by the user and via the GUI, to generate a combined neural network model that joins the output endpoint of the NN module with the first input endpoint of the first downstream NN module.

14. The system of claim 13, wherein one or more of the processors, in executing the instructions, are further to:
in response to the selection of the NN module, and in response to determining that the first downstream NN module is fully compatible with the NN module:
cause the first selectable graphical element to be rendered along with an indication that the first downstream NN module is fully compatible with the NN module.

15. The system of claim 13, wherein one or more of the processors, in executing the instructions, are further to:
determine that a second downstream NN module is fully compatible with the NN module, wherein the second downstream NN module differs from the first downstream NN module, and wherein in determining that the second downstream NN module is fully compatible with the NN module one or more of the processors are to:
determine that a second input endpoint, of the second downstream NN module, has the shape of the output endpoint, and
determine that the second downstream NN module has been trained when previously joined with the NN module;
in response to the selection of the NN module, and in response to determining that the second downstream NN module is fully compatible with the NN module:
cause a second selectable graphical element, that describes the second downstream NN module, to be rendered at the GUI, along with the first graphical element that describes the first downstream NN module,
wherein the second selectable graphical element is selectable, by the user and via the GUI, to generate an alternate combined neural network model that joins the output endpoint of the NN module with the second input endpoint of the second downstream NN module.

16. The system of claim 15, wherein the second downstream NN module differs from the first downstream NN module at least in that it has different functionality than the first downstream NN module.

17. The system of claim 16, wherein the NN module is an image features module, the first downstream NN module is an object classification module, and the second downstream NN module is a grasp detection module.

18. The system of claim 16, wherein one or more of the processors, in executing the instructions, are further to:
  determine that a third downstream NN module is compatible with the NN module, but not fully compatible with the NN module, wherein in determining that the third downstream NN module is compatible with the NN module, but not fully compatible with the NN module one or more of the processors are to:
    determine that a third input endpoint, of the third downstream NN module, has the shape of the output endpoint, and
    determine that the third downstream NN module has not been trained when previously joined with the NN module;
  in response to the selection of the NN module, and in response to determining that the third downstream NN module is compatible with the NN module, but not fully compatible with the NN module:
    cause a third selectable graphical element, that describes the third downstream NN module, to be rendered at the GUI, along with the first graphical element that describes the first downstream NN module, and along with the second graphical element that describes the second downstream NN module, wherein the third selectable graphical element is selectable, by the user and via the GUI, to generate a further alternate combined neural network model that joins the output endpoint of the NN module with the third input endpoint of the first downstream NN module, and that requires training, when joined with the NN module, prior to use.

19. The system of claim 16, wherein one or more of the processors, in executing the instructions, are further to:
  in response to the selection of the NN module, and in response to determining that the third downstream NN module is compatible with the NN module, but not fully compatible with the NN module:
  cause the third selectable graphical element to be rendered along with an indication that the third downstream NN module is not fully compatible with the NN module.

20. The system of claim 13, wherein in determining that the first downstream NN module has been trained when previously joined with the NN module one or more of the processors are to:
  determine that a version identifier assigned to the NN module matches a first version identifier assigned to the first downstream NN module.

\* \* \* \* \*